United States Patent [19]
Walker et al.

[11] 3,954,922
[45] May 4, 1976

[54] BUBBLE-SHEARING DIFFUSER

[75] Inventors: James Donald Walker, Aurora, Ill.;
Richard R. Bridge, Beloit, Wis.

[73] Assignee: Peabody Galion Corporation, New York, N.Y.

[22] Filed: Feb. 28, 1974

[21] Appl. No.: 446,705

[52] U.S. Cl............................. 261/121 R; 261/124;
261/DIG. 5; 261/DIG. 47; 261/DIG. 70
[51] Int. Cl.²................................................ B01F 3/04
[58] Field of Search............... 261/121 R, 123, 124,
261/DIG. 70, 77, 126, DIG. 5, DIG. 47

[56] References Cited
UNITED STATES PATENTS

| | | | |
|---|---|---|---|
| 3,153,682 | 10/1964 | Walker | 261/124 |
| 3,182,978 | 5/1965 | Reilly | 261/124 |
| 3,359,017 | 12/1967 | Schaub | 24/19 X |
| 3,501,133 | 3/1970 | Dreier et al. | 261/124 |
| 3,608,834 | 9/1971 | MacLaren | 261/121 R X |
| 3,781,000 | 12/1973 | Paasschens et al. | 261/124 |
| 3,790,142 | 2/1974 | Goodman et al. | 261/124 |

FOREIGN PATENTS OR APPLICATIONS

| | | | |
|---|---|---|---|
| 1,088,218 | 10/1967 | United Kingdom | 261/124 |
| 70,072 | 2/1959 | France | 261/121 R |

Primary Examiner—Frank W. Lutter
Assistant Examiner—William Cuchlinski, Jr.
Attorney, Agent, or Firm—Darbo, Robertson & Vandenburgh

[57] ABSTRACT

Diffusers on the bottom of a submerged header each include coarse bubble orifices which discharge a stream of air to form a bubble or film on the underside of a horizontal spreader at the edges of which the bubble is sheared by flowing water into multitudinous tiny bubblets rising in the surrounding liquid as a cloud. A second horizontal spreader, slightly above the first, has a similar action, shearing into fine bubblets any larger bubbles which escape from the first spreader to the second. Edges are staggered to supply air to different parts of the water flow. The rising bubblets set up a conventional rolling action in the body of liquid. It is this rolling action which produces the flow of water past the spreaders to shear the bubbles at their edges. A snap-in screw-tightened band secures each diffuser to the header.

3 Claims, 4 Drawing Figures

BUBBLE-SHEARING DIFFUSER

INTRODUCTION

The invention of which the present disclosure is offered for public dissemination in the event adequate patent protection is available relates to a field represented by aeration of sewage by diffusion of air deep in huge tanks. For many years the standard method of diffusion was that known as fine-bubble, or porous-media, diffusion. It was and is recognized that oxygen transfer efficiency depends on having a multitude of very fine bubblets. A given quantity of air has much greater area of contact with the water if it is broken up into fine bubbles than if it is only divided into large bubbles. However, the porous media used for fine-bubble liberation tended to clog. Clogged diffusers required more power for pumping air and tended to be less efficient in other respects. Periodic cleaning was a recognized necessity, but a considerable expense and a great nuisance.

In more recent years, acceptable transfer efficiency and lower power requirements have been achieved with coarsebubble liberation which was relatively free from clogging. In the most successful form, transfer efficiency was achieved largely by depending upon turbulence in the vigorous air-lift column upwardly of the discharge area for breaking the coarse bubbles initially liberated into finer bubbles or bubblets.

According to the present invention, the dividing of the air stream into the necessary fine bubblets is achieved more promptly after coarse bubble liberation by using spreaders just above the points of liberation and relying jointly on dividing the air stream between different paths and on the sweep of the water currents induced by air-lift action to shear the air stream into fine bubblets at the edges of the spreaders.

Similar prompt division of the air stream into bubblets was abortively achieved a number of years ago by providing a pumped water stream which sheared the air stream at the edges of spreaders, but the water pumping proved troublesome and expensive and the system was largely abandoned. The present invention achieves this efficiency without the trouble or expense of the water-pumping system, relying upon the shearing action of the water at the peripheral zones of the huge rolls of water which are set up in the course of this type of aeration.

The rolling action mentioned occurs even with prior types of diffusion. The diffusers were mounted in a line along one side of a tank (or of a zone) so that the rising water would set up a rolling action of the entire body of water in the adjacent zone. This rolling action has heretofore been extremely useful in stirring the tank and in bringing successive increments of the body of water into the area of aeration. According to the present invention, this rolling action which exists for other reasons is utilized to accomplish the prompt shearing of the air stream into bubblets. Of course, upon initial liberation of air through the present diffusers to a quiescent body of water in a tank, the shearing action is not immediately present. Both the lifting action of the bubbles and the aeration efficiency may be poor initially. But very quickly the rolling action starts so that shearing begins. As the shearing begins, it increases the efficiency and the airlift effect, and the rolling action increases in speed until, very soon, the maximum speed and full shearing action are achieved.

The rolling action has probably produced some shearing action in connection with prior diffusers. It is believed, however, that there has not been continuous shearing by the rolling water at the edges of a spreader which has spread a coarse air stream into a thin film so that shearing produces very fine bubblets.

Objects and advantages of the invention may become more apparent from the following description and from the drawings.

DESIGNATION OF FIGURES

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

Figure 4:
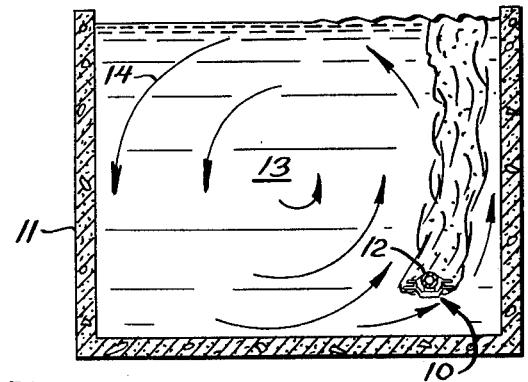
FIG. 4 is a view illustrating one conventional position of diffusion headers in a tank of liquid and the roll of the water in the tank which produces the bubbletshearing action of this invention.

According to conventional treatment of sewage and other liquid wastes, an aeration tank 11 of FIG. 4 represents an important part of sewage treatment. Usually readily settleable solids will have been settled out, and the remaining sewage led to the tank 11 will be mixed with return activated sludge for biochemical treatment of the sewage. Nearly all sewage is now treated by one form or another of activated sludge treatment.

The presence of dissolved oxygen in the body of liquor is essential, and a relatively high level of dissolved oxygen is highly desirable. For many years the air has been supplied by diffusion elements here represented by the improved diffuser 10 located along a line of headers 12 along one side of the tank 11, or at least along one side of a wide zone 13. The headers would liberate air all along their length and this air would tend to rise, producing an air-lift effect on the liquor. This air-lift effect would set up a huge roll, indicated by arrows 14, which would stir the entire tank and bring successive increments of the tank contents into the proximity of aeration headers 12. Most of the rising air would escape at the surface, but preferably some of the air would be in the form of bubbles fine enough to be carried throughout the roll.

Usually the headers 12 could be raised for servicing. For example, they could be carried by a downcomer 16 which might be a one-piece downcomer that could be lifted or might comprise two pieces, 16 and 16', connected by a swiveling joint which, in improved form, is shown here at 17. Heretofore, the upper downcomer 16' has had a swiveling joint at its upper end, and raising has been accomplished by swinging the upper downcomer 16' about its upper swivel joint, allowing the lower downcomer 16 to hang down from it as the assembly was raised.

PREFERRED MODE OF USE LOW LOSS SWIVEL DOWNCOMER

To meet the requirement of the United States law of disclosing the best mode of use contemplated, the preferred swivel 17 is generally illustrated. For the purpose of low head loss or low friction of the air flow through it, it is free from the internal spokes characteristic of such swivels heretofore. The two parts 18 and 19 are held in sealed contact with one another by a bale 21; flanges 22 and 23 having a nested seal relationship which maintains their respective unobstructed internal openings in alignment with one another. Preferably the upper downcomer 16' is rigidly positioned, and the header 12 is raised by swinging the lower header 16 about the axis of swivel 17. This may be accomplished by a hauling line 20, partly shown, secured at the foot of header 16 and extending up to a position where its upper end is secured in easy reach above the water level. The hauling line is preferably of sturdy monofilament nylon, the smoothness of the monofilament being preferred for cleanliness. Its upper end is provided with means for readily attaching it to a power winch. The preferred mode described under this heading is deemed appropriate subject matter for a separate application in the name of one of the present applicants.

DESCRIPTION OF THE PREFERRED FORM OF THE PRESENT INVENTION

Figure 1:
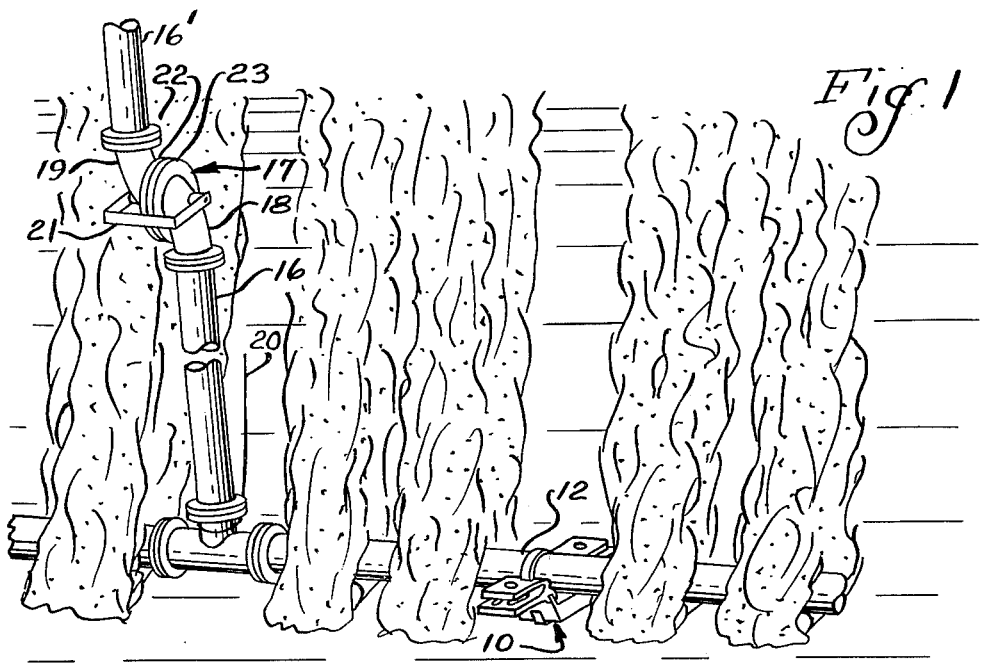
FIG. 1 is a view of perspective nature showing a header deep in a body of liquid, with clouds of bubblets arising but omitted from one position to show the form of the diffuser chosen for illustration of this invention.
Figure 2:
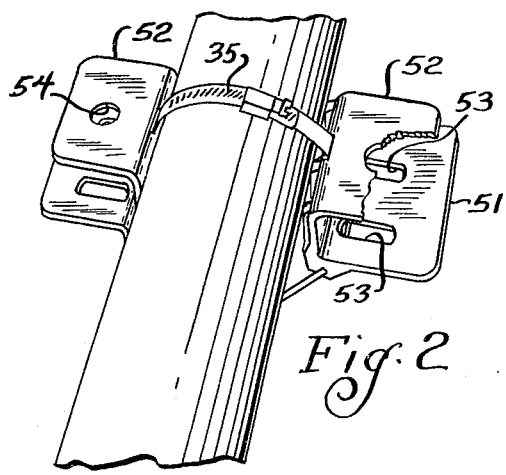
FIG. 2 is another view of perspective nature on a larger scale, with part of one spreader broken away.
Figure 3:
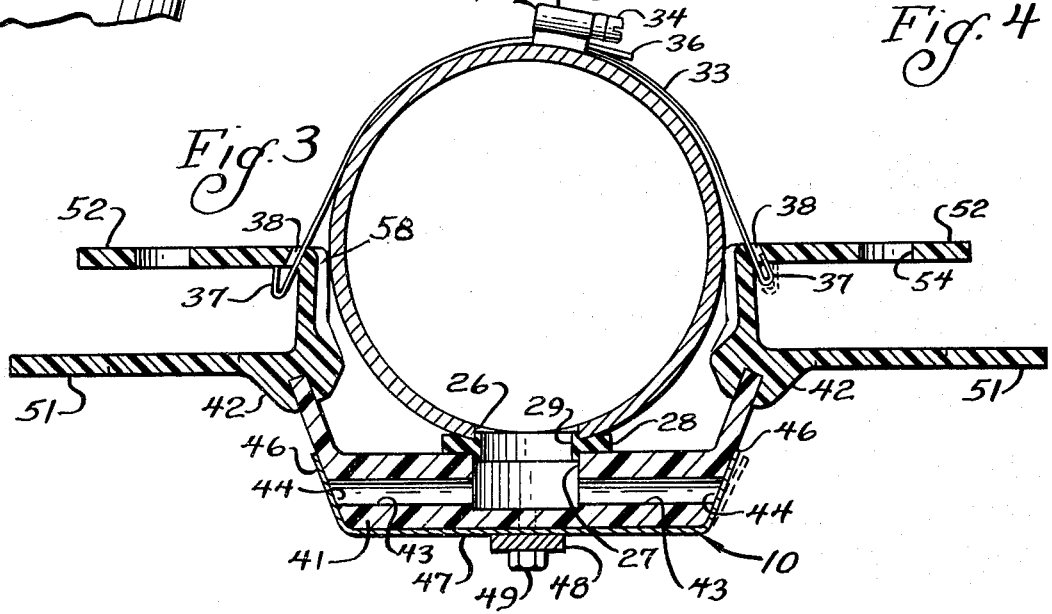
FIG. 3 is a vertical sectional view taken approximately on a plane perpendicular of the header and through the chosen diffuser.

The preferred form of the invention to which the present application is directed is seen generally in FIGS. 1 and 2, but its details are shown best in FIG. 3. For each diffuser the header 12 is provided with an opening 26 at its bottom through which air is discharged into a mating vertical passage 27 of the diffuser 10. Preferably a gasket 28 with annular flanges 29 on opposite sides thereof seals the diffuser to the opening 26 and maintains alignment between opening 26 and passage 27 in diffuser 10. The gasket 28 is preferably thick enough and compressible enough to conform to a variety of header diameters.

The diffuser 10 (which includes spreaders 51 and 52 as later described) is preferably secured on and in sealed relation to the header 12 by a clamp-band assembly 31. This assembly 31 resembles a well-known hose clamp in having a first end 36 sliding along the second end 33, a screw device 32 carried by the second end 33 with one side of a screw 34 therein engaging slots (FIG. 2) in the first end 36 to draw the end 36 through the unit 32. Instead of the band ends 33 and 36 being opposite ends of a single band as in hose clamps, each is an end of a band which has at its opposite end a securing formation 37. In FIG. 3, the right-hand end 37 is shown being slipped through an aperture 38 in the diffuser 10. The formation 37 is essentially a short leg which springs out slightly when the insertion through the aperture 38 is complete, as indicated by dotted lines at the right in FIG. 3. Thus, as shown at the left in FIG. 3, the securing formation 37 is securely anchored in the diffuser 10.

The mounting of the diffusers is extremely simple and quickly accomplished. A gasket 28 is fitted to the bore 27 of a diffuser 10, which is then fitted to the bottom of header 12 with its upper flange 29 extending into a bore 26. A clamp assembly 31 will ordinarily already be attached at one end, that end (anchoring formation 37) having been thrust through the respective aperture 38. With the diffuser 10 held in place by one hand, the loose end of clamp assembly 31 will, with the other hand, be drawn closed around header 12 and thrust through the other aperture 38. At this time, the clamp-band assembly 31 will be quite loose on header 12 to permit insertion of the free-end portion 37. Now the screw 34 will be turned with a screw driver to tighten the clamp-band assembly 31 on header 12, usually while still holding the diffuser 10 in place by hand. When screw 34 is tight, the assembly 31 will hold the diffuser 10 firmly in place and sealed to the header by gasket 28. Great assembly speed by one man is thus achieved.

It should be understood that the three main illustrated parts of the diffuser, the central or main body 41 and the two spreader units 42, are firmly secured together by cementing or welding (using solvent or heat). Actually, the plastic portions of the diffuser 10 could be molded in one piece, and perhaps such manufacture will be chosen in the future. At present, manufacture in three pieces is deemed more economical, and has an advantage that for a wide range of header diameters 12 it is possible to provide two or more sizes of main portions 41, using the same spreader units 42 in all instances.

The central portion 41 is provided with a bore 43 horizontally through it, each side portion of which communicates inwardly with bore 27 and terminates outwardly in an orifice 44. It should be understood that the term "bore" is not intended to be limited to a drilled passage but includes in each instance a passage of like nature formed in the molding operation. If a variety of orifice sizes were desired, the bores 43 might be formed initially by molding, with the orifices drilled to suit.

At present, it is preferred to make the bores 43 and orifices 44 all large enough to accommodate, without excessive back pressure, the maximum gas flow expected to be used in a wide variety of installations and to use spring closures 46 as seen best in FIG. 3. Each spring closure 46 may extend from a base portion 47 secured by a clamping bar 48 and screws 49. The spring closure 46 preferably rests lightly on the orifices 44 and springs away only slightly with low gas flow but more and more with successively greater gas flows. Thus at less than maximum expected gas flow, the orifices 44 are somewhat further restricted by the spring closures 46 so that there is no opportunity for the surrounding liquid to creep into the orifices 44 and cause the build-up of accretions and ultimate blockage or partial blockage of the orifices.

The spring closures 46 make it possible to operate the diffuser 10 at a low gas flow for some months or years before the ultimate design capacity of a treatment plant has been reached, substantially without danger that accretions will form which impede the gas flow, especially when increased loading of the treatment plant requires increased gas flow.

It is not expected that bubbles liberated through orifices 44 will be fine enough for acceptable oxygen-transfer efficiency. This essential efficiency is achieved, however, by the aid of reaction of the water currents near the periphery of the rolling action (represented by arrows 14 in FIG. 3) with the spreader units 42. Each spreader unit 42, in the illustrated form now preferred, includes a lower spreader 51 and an upper spreader 52. The lower spreader 51 preferably has a pair of slots 53 therein, as seen best in FIG. 2. Upper spreader 52 is apertured out of the rise line from apertures of the lower spreader 51. Thus, as shown, a single passage 54 is located midway between the vertical planes through slots 53.

It is desirable, as in the illustrated form of the invention, that the headers be fully drained in operation so that no sludge will dry within the headers with danger of flaking off and causing clogging even of these clog-resistant orifices.

Tests have shown that the illustrated form of diffuser achieves a very satisfactory production of fine enough bubblets to achieve acceptable oxygen-transfer efficiency. By observation it is seen that the passing water stream shears off a multitude of fine bubbles as it passes the outer edges of each of the spreaders 51 and 52. It is assumed that most of the air which is sheared at the outer edges of the upper spreader 52 reaches the spreader 52 by passing through the slots 53. There may be shearing action of this air along the edges of the slots by the passing liquid, but whether there is or not, the air leaving the upper spreader 52 is satisfactorily reduced to fine bubblet size.

The principle of shearing fine bubblets from a spreader by the liquid movement induced by the air-lift action of the bubbles rising from the diffuser can be applied with widely differing structures, though not necessarily with a transfer efficiency as high as that achieved by the illustrated form of the invention. One other form contemplated as a variant of the present invention distributes the air along the under side of an inverted trough. Air discharged as coarse bubbles from the trough at its bottom or at notches or apertures above its bottom is spread by plates (or a single plate) above the discharge point and sheared at the edges of such plate. In some situations, such inverted troughs may be used in place of headers, or as lateral distributors from headers to give the effect of air liberation over a wide band along the headers. Another form contemplated is to attach a single plate across the top of the headers and have a series of apertures positioned to liberate air from the header along each side of it, the apertures being close enough to the bottom of the header for drainage of substantially all liquid from the header.

The shearing of a film spread out under a spreader, as here taught, is to be distinguished from the orifice-like action of an inverted bowl previously proposed, which liberates coarse streams through notches or other apertures. It also should be distinguished from another prior proposal in which air was liberated under an overhang but mostly streamed past it rather than being spread into a film by it. Only the shearing of a stream spread out into a film achieves the present invention's quick dividing into fine bubblets.

Perhaps the ultimate of the invention is only achieved if the air stream flow immediately to spreaders of a nature to cause a coarse division of the air into different paths, some flowing through slots 53, with shearing of the different parts of the stream. Quickness of the break-up into very fine bubbles is important. If the air should rise a foot before being finely divided, extra air pressure is required to liberate the gas at a lower level to achieve as much oxygen-transfer efficiency as if that foot of bubble rise is not partially wasted.

It is desirable that, as illustrated in FIG. 3, the diffuser bear on the header at three spaced points or zones so that its positioning will be firm; and so that it will undergo no more than slight flexing, thus ensuring horizontal disposition of the spreaders. Reinforcing ribs 58 provide the contact points at the side of the header. Several larger sizes of headers more frequently used can be accommodated by selecting the size of base parts 42, or even by shortening the sloping wings on them. If the header is too small for a proper fit in this manner, blocks may be applied to the inner shoulders of the spreaders, preferably being cemented thereto at the factory.

ACHIEVEMENT

Acceptable oxygen-transfer efficiency is achieved by the present invention, and very good economy of energy. The coarse-bubble liberation is very unlikely to encounter any clogging difficulty. Throughout a wide range of air discharge volumes, the valves 46 keep water from creeping into the orifices, but the back pressures are not much higher than a minimum suitable for ensuring reasonable equality of flow through all of the diffusers on a header. The valves are not intended to be reliably water-tight, but if water seeps in during a period when air is not being pumped, the valves will prevent entry of any larger solids that might cause clogging later.

Because the breakup of bubbles into fine bubblets is achieved by shearing action at the spreaders, only slightly above the point of initial discharge, slightly greater efficiency is to be expected than when the coarse initial bubbles rise further and are only broken into fine bubblets by vigorous turbulence in the air-lift columns.

We claim:
1. A diffuser for gasrelease while submerged in liquid including a body having a passage therethrough terminating in an orifice for coarse-bubble liberation, said orifice being positioned in an outer part of the diffuser at a location where it will liberate bubbles substantially directly into the surrounding liquid during long periods of bubble-liberation while the diffuser is submerged in a liquid, and a spreader close to said orifice in the rise-path of gas liberated from said orifice; said spreader being of two-stage nature with a lower spreader apertured to allow some of the gas to rise through it to the under side of the upper spreader, both spreaders being so located on the diffuser that, if the diffuser is so located that gas liberated from it causes a rolling movement of the liquid in which it is submerged, the spreaders will be swept by the rolling liquid to shear bubbles from the spreader.

2. A diffuser for gasrelease while submerged in liquid including a body having a passage therethrough terminating in an orifice for coarse-bubble liberation, said orifice being positioned in an outer part of the diffuser at a location where it will liberate bubbles substantially directly into the surrounding liquid during long periods of bubble-liberation while the diffuser is submerged in a liquid, and a spreader close to said orifice in the rise-path of gas liberated from said orifice; said spreader being of two-stage nature with a lower spreader apertured to allow some of the gas to rise through it to the under side of the upper spreader, both spreaders being so located on the diffuser that, if the diffuser is so located that gas liberated from it causes a rolling movement of the liquid in which it is submerged, the spreaders will be swept by the rolling liquid to shear bubbles from the spreader; and each said spreader having elongate edges from which the gas spreading under it can escape at numerous points.

3. A diffuser for submerged gas-release including a body having a wall substantially exposed to space surrounding the diffuser and having a passage therethrough terminating in an orifice for liberation of coarse bubbles into said space throughout continuous operation, and a spreader close to said orifice in the rise-path of gas liberated from said orifice when the diffuser is submerged in liquid; said spreader being of two-stage nature with a lower spreader apertured to allow some of the gas to rise through it to the under side of the upper spreader, both spreaders projecting from the diffuser into said space and being so located on the diffuser that, if the diffuser is so located that gas liberated from it causes a rolling movement of the liquid in which it is submerged, the spreaders will be swept by the rolling liquid to shear bubbles from the spreader.

* * * * *